(12) United States Patent
Fuchs et al.

(10) Patent No.: US 9,531,151 B2
(45) Date of Patent: Dec. 27, 2016

(54) METHOD FOR GENERATING A BURST MODE BY MEANS OF SWITCHING A POCKELS CELL

(71) Applicant: High Q Laser GmbH, Rankweil (AT)

(72) Inventors: Dominik Fuchs, Goefis (AT); Michael Schmidt, Gaissau (AT); Hubert Adamietz, Ochtendung (DE); Juerg Aus Der Au, St. Gallen (CH)

(73) Assignee: HIGH Q LASER GMBH, Rankweil (AT)

( * ) Notice: Subject to any disclaimer, the term of this patent is extended or adjusted under 35 U.S.C. 154(b) by 0 days.

(21) Appl. No.: 14/931,540

(22) Filed: Nov. 3, 2015

(65) Prior Publication Data
US 2016/0126693 A1 May 5, 2016

(30) Foreign Application Priority Data
Nov. 4, 2014 (EP) .................................... 14191719

(51) Int. Cl.
*H01S 3/107* (2006.01)
*H01S 3/10* (2006.01)
(Continued)

(52) U.S. Cl.
CPC ........... *H01S 3/107* (2013.01); *H01S 3/10007* (2013.01); *H01S 3/10061* (2013.01); *H01S 3/235* (2013.01); *H01S 3/08054* (2013.01)

(58) Field of Classification Search
CPC .............................. H01S 3/107; H01S 3/10007
See application file for complete search history.

(56) References Cited

U.S. PATENT DOCUMENTS 7,649,667 B2 1/2010 Bergmann et al.
2014/0126591 A1* 5/2014 Kajiyama ............... H01S 3/107
372/25

FOREIGN PATENT DOCUMENTS

EP 1 418 460 A1 5/2004
EP 2 775 619 A1 9/2014
(Continued)

OTHER PUBLICATIONS

D. Helie and R. Vallee, "Micromachining of Thin Glass Plates with a Femtosecond Laser", Proc. of SPIE vol. 7386, 738639, Photonics North 2009.
(Continued)

*Primary Examiner* — Dung Nguyen
(74) *Attorney, Agent, or Firm* — Muncy, Geissler, Olds & Lowe, P.C.

(57) ABSTRACT

Method for generating a series of laser pulses with a laser assembly, the laser assembly at least having two reflecting members, a laser medium and an electro-optical modulator are disclosed. The laser assembly operates in a light amplifying mode and runs a pulse extraction sequence. The pulse extraction sequence is run by applying a defined voltage change with reference to the amplification voltage, wherein changing of the voltage is adjusted such that at least one intermediate switching state is generated on side of the electro-optical modulator, the intermediate switching state providing a particular change of polarization of the amplified laser radiation by the electro-optical modulator, such that a final switching state is generated on side of the electro-optical modulator by applying a final extraction voltage at the end of the time period.

15 Claims, 4 Drawing Sheets

(51) Int. Cl.
*H01S 3/23* (2006.01)
*H01S 3/08* (2006.01)

(56) References Cited

FOREIGN PATENT DOCUMENTS

EP 2775619 * 9/2014
WO 2009/103313 A1 8/2009

OTHER PUBLICATIONS

F. Ahmed, M.S. Lee, H. Sekita, "Display Glass Cutting by Femtosecond Laser induced single shot periodic void array", Appl. Phys. A (2008) 93, 189-192.
B. U. Tietze and Ch. Schenk, "Halbleiter-Schaltungstechnik", Springer, 13th Edition, p. 774.
European Search Report issued on Jun. 17, 2015 in EP Application No. 14 19 1719.

* cited by examiner

METHOD FOR GENERATING A BURST MODE BY MEANS OF SWITCHING A POCKELS CELL

This application claims priority to European Patent Application No.: 14191719.5, which was filed in Europe on Nov. 4, 2014, and which is herein incorporated by reference in its entirety.

The present invention generally pertains to a method for generating a series of laser pulses, in particular of a burst of laser pulses, by use of an electro-optic system in a laser assembly.

Established mechanical methods for machining of fragile materials such as saw cutting and scribing often cannot satisfy the industrial needs or requires extensive post processing to meet the needs in terms of quality and throughput. Nowadays, lasers are increasingly used for machining of different types of materials. Laser cutting processes such as melting, vaporization and fusion cutting are used for cutting of ductile materials like metals and polymers. These methods are not appropriate for cutting of transparent or semi-transparent materials to meet required high quality and particular cutting speed standards.

As for instance known from D. Helie and R. Vallee, "*Micromachining of Thin Glass Plates with a Femtosecond Laser*", *Proc. of SPIE Vol.* 7386, 738639, *Photonics North* 2009, for such cutting of transparent materials a controlled fracture technique is a well suitable method for machining of those materials.

When curvilinear and/or close shaped internal features are needed to be cut a laser direct ablation process can be used. However, the ablation rate, i.e. the processing speed of the direct ablation method, is scaled with the laser average power and normally limited to several mm/s. This fact limits the processing speed for a laser direct ablation processes.

Application of femtosecond laser filamentation for machining of glass substrate is an interesting alternative to the direct ablation process. An idea of fast cutting of a display glass where the sample is pre-processed using femtosecond laser pulses prior to glass cleaving was proposed by Ahmed et al. (F. Ahmed, M. S. Lee, H. Sekita, "*Display Glass Cutting by Femtosecond Laser induced single shot periodic void array*", *Appl. Phys. A* (2008) 93, 189-192). The maximum processing speed achieved in this study was 15 mm/s. The speed has been limited by the minimum distance between voids, because it was not possible to cleave the sample when void period was larger than 10 µm.

The stress build-up and micro-defects induced by filamentation are known for being used for cutting of thin borosilicate glass substrate and for production of simple 3D parts from different types of glass.

A main disadvantage of above approaches for processing of material is the quite low processing speed which can be reached due to available laser powers, pulse durations, repetition frequencies and pulse shapes. The processing effect, e.g. effected cut or crack in the respective material, mainly depends on these factors.

With providing a series of short or ultra-short laser pulses with high repetition rate the processing of material can be performed with correspondingly high processing speed, as a greater number of pulses can be applied to the material with respect to an identical time period. Such pulses may additionally be adjusted regarding their intensities. Such generation of short pulses and a successive adjustment of their intensities using a specified switching of a Pockels cell is described e.g. in the U.S. Pat. No. 7,649,667 B2.

By use of such approach a defined number of short pulses is applicable in a defined time interval (i.e. given by the amplifier). However, as the possible speed of switching on and off the Pockels cell is limited, the generation of pulses is limited accordingly. Moreover, for providing a desired laser power to be ejected, a defined level of light amplification has to be reached before ejecting each respective pulse.

A further aspect regarding material processing relates to the individual effect (e.g. size of an effected crack) of one single laser pulse on interaction with the material. Such effect depends not only on pulse durations and/or energies but also on a time delay between successive pulses. Simultaneous adjustability of all these factors is limited with prior-art systems as that above. Optimised (in sense of more efficient) settings are hard or even not to be realised for respective specific materials like glass.

It is therefore an object of the present invention to provide an improved laser system which overcomes above-mentioned disadvantages.

A further object of the invention is to provide a laser system enabling faster processing of material by optimised laser parameters, in particular by more efficient production of processing effects at the material.

These objectives are achieved by realising the features of the independent claims. Features which further develop the invention in an alternative or advantageous manner are described in the dependent patent claims.

The invention generally relates to a method for producing a series of burst pulses extracted from an amplified laser radiation. The extraction of the burst pulses is realised by use of an electro-optic system, in particular a Pockels cell system, and, furthermore, by only one single switching sequence of the electro-optic system. The electro-optic system is preferably provided in a laser resonator and operated for maintaining amplification of laser light, e.g. a laser pulse, by circulation inside the laser resonator and interaction with a pumped laser medium. Alternatively, the generation of the burst of laser pulses may be done using a regenerative laser amplifier of any other kind of suitable laser system comprising a Pockels cell known from prior art.

In general, an electro-optic system in form of a Pockels cell can be considered as voltage-controlled wave plate, where the value of birefringence can be adjusted electronically to produce a desired phase retardation, in particular regarding s- and p-polarised light. This birefringence is proportional to the applied electrical field.

The principle function of Pockels cell is exemplarily described in the following. A Pockels cell enables to alter the polarisation of a transmitted light beam when voltage is applied to the cell by e.g. causing phase retardation between orthogonal polarisation components (portions) of the beam.

In the absence of an applied field, there is no difference in the phase retardation between orthogonal polarisation components of the light beam because the refractive index then is the same for both polarisation directions and so there is no polarisation change in the transmitted light. However, an applied electric field creates fast and slow axes at 90 degrees to one another. The difference in velocity for beams with polarisation portions along these two directions, with voltage applied, retards the phase of one polarisation component relative to the other thereby changing the polarisation state of the emerging beam.

The relative phase retardation Φ is given by the following expression:

$$\Phi = \frac{2\pi \cdot \Delta n \cdot L}{\lambda}.$$

Here, $\Delta n$ is the birefringence (the difference in refractive index for the two polarizations of light), L is the crystal length, and $\lambda$ is the wavelength.

The emerging intensities of light with polarisation directions along orthogonal directions are dependent on the size of $\Delta n$. For linearly polarised light that is incident at 45° to the fast and slow axes of the Pockels cell, the transmitted intensity with the same polarisation direction as the incoming light, which is the intensity that would be transmitted through a parallel polariser, is given by the expression for $T_\parallel$; the intensity that would be transmitted through a crossed polarizer is given by the expression for $T_\perp$:

$$T_\parallel = \cos^2\left(\frac{\Phi}{2}\right) \text{ and } T_\perp = \sin^2\left(\frac{\Phi}{2}\right).$$

In general, the transmitted light is elliptically polarized. For the special case when the retardation $\Phi$ is $\pi/2$, or the quarter-wave value, the transmitted light is circularly polarized; when the retardation $\Phi$ is $\pi$, which is the half-wave retardation value, the polarization of the transmitted light is rotated by 90°. The expression that relates the induced refractive index change $\Delta n$ to the electric field of the Pockels cell is of the form:

$$\Delta n = r_{ij} E n_0^3,$$

where $r_{ij}$ is the electro-optic coefficient, E is the electric field that is experienced by the crystal with the application of an applied voltage V, and $n_0$ is the ordinary refractive index. For the transverse configuration used e.g. with BBO Pockels cells, E=V/d, where V is the applied voltage and d is the electrode separation. At the half-wave voltage $V_{\lambda/2}$, the phase retardation $\Phi$ is equal to $\pi$, and therefore:

$$V_{\frac{\lambda}{2}} = \frac{\lambda \cdot d}{2 r_{22} n_0^3 \cdot L}.$$

Note that the half-wave voltage for a transverse field Pockels cell is proportional to d/L, the electrode spacing divided by the crystal length. For a longitudinal Pockels cell, the half-wave voltage is independent of crystal length.

The invention relates to a method for generating a series of laser pulses (a burst of laser pulses) with a laser assembly, in particular a laser resonator or a regenerative amplifier. The laser assembly comprises at least two reflecting members. In particular, one of the reflecting members may be partly transparent as to a defined wavelength, e.g. as to pump light, and may be reflecting a wavelength of amplified laser light inside of the laser assembly (resonator). Alternatively or additionally, one of the reflecting members can be in form of a polarisation-selective element, in particular a polarising beam-splitter cube or a thin-film polariser, for extracting at least a part of laser radiation from the assembly.

The laser assembly further comprises a laser medium and an electro-optical modulator, in particular a Pockels cell, for providing voltage-controlled change of polarisation and/or phase.

The electro-optical modulator and the laser medium in particular are arranged in between the two reflecting members, thus providing a resonator. With other words, the reflecting end members, e.g. (semi-transparent) mirrors, build a laser resonator which additionally comprises the laser medium. The electro-optical modulator may be provided within the resonator in such manner that light which circulates in the resonator runs through the Pockels cell on each circulation.

The laser medium e.g. may be embodied as a ytterbium- or neodymium-doped laser medium like ytterbium doped wolframate (e.g. Yb:KYW or Yb:KGW) or neodymium doped vanadate (e.g. Nd:YVO$_4$).

The method comprises operating the laser assembly in a light amplifying mode by applying an amplification voltage to the electro-optical modulator and thereby providing circulation of an introduced seed laser pulse in the laser assembly with defined circulation time (e.g. defined by the (optical or geometrical) distance between the reflecting end members) and amplification of the seed laser pulse due to interactions with the laser medium on each circulation, wherein an amplified laser pulse is provided. In addition, a pulse extraction sequence is run for extracting at least one laser pulse from the laser assembly by varying, in particular dropping or rising, the amplification voltage applied to the electro-optical modulator.

According to the invention, the pulse extraction sequence is run for a defined time period by applying a defined voltage change with reference to the amplification voltage, wherein changing of the voltage is adjusted such that at least one intermediate switching states is generated on side of the electro-optical modulator by applying an intermediate voltage within the time period. The intermediate switching state provides a particular change of polarisation of the amplified laser radiation by the electro-optical modulator. Moreover, a final switching state is generated on side of the electro-optical modulator by applying a final extraction voltage at the end of the time period, in particular wherein the intermediate switching state differs from the final switching state. With other words, within the time period of switching the electro-optical modulator at least one defined intermediate and one final switching state are provided, in particular wherein the change of polarisation effected by the modulator provided in the intermediate switching state differs from the effected polarisation change by the modulator being in the final switching state.

Additionally, the changing of the voltage is adjusted such that at least one intermediate interaction of the amplified laser pulse with the electro-optical modulator is provided as to at least one respective intermediate circulation of the amplified laser pulse, wherein the electro-optical modulator is in the at least one intermediate switching state (i.e. the intermediate voltage is applied to the modulator). A final interaction of the amplified laser pulse with the electro-optical modulator—being in the final switching state—is provided as to a circulation of the amplified laser pulse successive to the at least one intermediate circulation.

In particular, the final switching state is adjusted so that the entire (remaining part of the) amplified laser light (of the amplified laser pulse) is effected by the electro-optical modulator so that the polarisation is changed so that the resulting polarisation state meets a defined total extraction criterion. By that, all remaining amplified laser light is extractable from the laser assembly by applying the final switching state.

With other words, there occurs at least one interaction of the circulating laser light with the electro-optical modulator during the electro-optical modulator being in a non-amplification and non-final switching state (intermediate switching state) and a further interaction of the circulating laser light with the electro-optical modulator when the electro-optical modulator is in final switching state. The interaction in the final switching state is provided in direct succession to the at least one interaction in the intermediate switching state, i.e. with the next (successive) circulation of the laser light in the assembly, in particular wherein circulating pulse light is entirely extracted from the assembly.

Consequently, a series (burst) of at least two laser pulses is extracted according to the interactions of the amplified laser pulse at each circulation with the electro-optical modulator being in respective switching states.

The pulse extraction sequence is defined by the time period within which the voltage change is provided until (including) reaching the final voltage (e.g. 0V). The voltage change can be in form of a drop or rise of voltage, in particular comprising respective slopes and/or steps (jumps).

According to a preferred embodiment of the invention, the laser assembly comprises a polarisation-selective element. The polarisation-selective element can thereby consist of a polarising beam-splitter cube or a thin-film polariser. The polarisation-selective element in particular can be arranged (together with the laser medium) in between the two reflecting members or may be designed as one of the reflecting members. The polarisation-selective element preferably is arranged in such a way that it fully transmits one polarisation (e.g. p-polarisation) and fully reflects the corresponding perpendicular polarisation (e.g. s-polarisation).

Therefore, due to an interaction of the amplified laser pulse with e.g. the Pockels cell (electro-optical modulator) and the polarisation-selective element only a part of the amplified laser light (of the pulse) is switched out by the polarisation-selective element so that a defined extraction requirement is met. The remaining part of the amplified laser light that is not switched out remains circulating in the laser assembly.

Such extraction method provides a series of laser pulses with quite small pulse-to-pulse delay, e.g. the delay corresponds to the time of circulation of the amplified laser light inside of the resonator, and thus enables to emit two or more successive pulses with a small delay basically corresponding to a stress relaxation time of a material to be processed with these pulses. As a result, the burst of pulses causes a significantly greater effect (e.g. crack) at the material to be processed.

In particular, the polarisation of the amplified laser light of the circulating amplified laser pulse is changed by interactions with the electro-optical modulator in intermediate (or final) switching states with each circulation (of the amplified pulse) so that the resulting polarisation of the amplified light meets a defined extraction criterion, in particular a defined polarisation state. For instance, the s-polarised portion of the (elliptical or circular polarised) laser pulse is influenced (reflected) by the polarisation-selective element and thus extracted from the laser assembly. A part of the amplified laser light (e.g. p-polarised portion) is not influenced (transmitted) by the polarisation-selective element remaining circulating in the laser assembly. A ratio between transmitted and reflected parts of the amplified laser light with changed polarisation due to an intermediate or final switching state of the electro-optical modulator is adjustable by the applied voltage to the electro-optical modulator, wherein the birefringence effect of the electro-optical modulator can be adjusted accordingly.

The method according to the invention in particular provides an interaction of the electro-optical modulator with the amplified laser pulse—in presence of the intermediate or final switching states—so that the amplified laser pulse is provided with a changed polarisation state, wherein the changed polarisation state is defined by a ratio of at least two polarisation portions, the ratio depends on the applied intermediate voltage. One of these portions may correspond to an extraction effect provided by an extracting element of the laser assembly.

According to the invention, a part of the amplified laser pulse (with changed polarisation by the electro-optical modulator in defined manner, i.e. due to intermediate or final switching) is extracted based on polarisation sensitive splitting of laser light of the amplified laser pulse, e.g. by a polarising beam splitter, in particular wherein one of the at least two polarisation portions is extracted.

With respect to the invention, in particular, a seed laser pulse is introduced in the laser assembly by applying the amplification (gate or zero depending on the design of the laser assembly) voltage, wherein the laser medium is pumped with pump light, e.g. by a laser diode, and the introduced seed laser pulse is amplified at each circulation when running through the activated laser medium. The seed laser pulse may be introduced into the laser assembly by reflecting the incoming pulse by means of the polarising beam splitter. The seed laser pulse may furthermore comprise a particular polarisation direction.

Moreover, according to a further embodiment of the invention, the application of the defined voltage change (drop or rise) is synchronised with a propagation of the amplified laser pulse within the laser assembly so that the amplified laser pulse interacts with the electro-optical modulator (e.g. Pockels cell) during the at least one intermediate switching state. Such adaptation of the switching steps for the Pockels cell may be provided by trigger signals supplied by a controlling unit or a driver, respectively.

Thus, the individual states of birefringence of the electro-optical modulator can temporally be induced in correspondence with the moments when the amplified laser pulse passes the electro-optical modulator.

According to a particular embodiment of the invention, a first pulse of the series (burst) of at least two laser pulses is extracted due to an interaction of the amplified laser pulse with the electro-optical modulator in a first intermediate switching state and a second pulse of the series (burst) of at least two laser pulses is extracted due to an interaction of the amplified laser pulse with the electro-optical modulator in a second intermediate switching state, in particular wherein the voltage change is temporally adjusted with respect to the propagation of the amplified laser pulse in the laser assembly.

Regarding the voltages being applied in context of the method according to the invention, the amplification voltage can correspond to a gate voltage of the electro-optical modulator, in particular a $\lambda/4$-voltage, or to a zero voltage. Moreover, the voltage change can be in form of a voltage drop or a voltage rise, in particular comprising a voltage jump and/or defined slope. In particular, the amplification voltage and/or the voltage change depend on the design of the laser assembly.

Regarding the setting of the voltage change to be applied according to the invention, a set of voltage parameters can be defined for the voltage change, the voltage parameters for example defining a slope for the voltage change and/or a temporal extend of the time period.

In particular, the voltage parameters are defined in a manner such that the temporal extend of the time period corresponds to at least the circulation time, in particular a multiple of the circulation time, of the amplified laser pulse in the laser assembly for proving at least two intermediate laser pulses. Exemplarily, the temporal extend is in a range of 10 ns to 200 ns, in particular in a rage of 15 ns to 100 ns, wherein such values mainly depend on the design of the laser resonator and the related circulation time.

Additionally or alternatively, the voltage parameters can be defined in such a manner that the slope for the voltage change is comparatively shallow (slight), in particular in a range of 0.0 V to 15 V per nanosecond or 0.0 V to 250 V per circulation, respectively.

With other words, contrary to the switching of a Pockels cell according to prior art, here the switching process is temporally extended and modified in order to provide a longer switching period (providing intermediate polarising/switching states of the cell) and not focussing on a switching of Pockels cells' states as fast as possible.

According to a particular embodiment of the invention, the pulse extraction sequence comprises at least two voltage changing regions (zones), each of which defining a defined course of the voltage change providing particular pulse parameters, in particular pulse peak power, in particular wherein the course of the voltage change is defined varying over the at least two voltage changing regions, in particular with respect to individual slopes and durations.

Such adjustment of the voltage change at the electro-optical modulator e.g. provides for generation (ejecting) a number of individual burst pulses, each of which being adjusted in particular as to its pulse energy.

The invention also relates to a laser assembly, in particular a laser resonator or a regenerative laser amplifier, for generating a series of laser pulses, providing a defined circulation time of an amplified laser pulse in the laser assembly. The laser assembly comprises at least two reflecting members, in particular wherein at least one of which may be partly transparent for a wavelength of pump-light (and is reflecting amplified laser light in the resonator) and a laser medium which may structurally be combined with one of the reflecting members, in particular be of a one-piece construction. Further, the assembly comprises an electro-optical modulator, in particular a Pockels cell, for providing voltage-controlled change (modulation) of polarisation and/or phase and for extraction of laser light from the laser assembly by varying an amplification voltage applied to the electro-optical modulator (and thereby affecting polarisation of the amplified laser pulse in different manner). Furthermore, the laser assembly comprises a circuit for providing defined voltages to the electro-optical modulator and thereby driving the electro-optical modulator and a controlling unit at least for controlling switching of the circuit in a manner such that the defined voltages are applied to the electro-optical modulator.

According to the invention, the controlling unit and the circuit are cooperatively implemented so that the voltage is applicable to the electro-optical modulator according to a defined pulse extraction sequence, the pulse extraction sequence comprising a defined voltage change with reference to the gate voltage for a defined time period. In particular, the voltage changes comprise a drop or rise of voltage and/or respective slopes and/or voltage jumps within the time period. Thereby, changing of the voltage over time is adjusted such that at least one intermediate switching state is generated on side of the electro-optical modulator by applying an intermediate voltage within the time period. The intermediate switching state provides a particular change of polarisation of the amplified laser radiation by the electro-optical modulator. Additionally, a final switching state is generated on side of the electro-optical modulator by applying a final extraction voltage at the end of the time period. With other words, within the time period of switching the electro-optical modulator at least one defined intermediate and one final switching state are provided.

Additionally, the changing of the voltage is adjusted such that at least one intermediate interaction of the amplified laser pulse with the electro-optical modulator is provided as to at least one respective intermediate circulation of the amplified laser pulse, wherein the electro-optical modulator is in the at least one intermediate switching state. A final interaction of the amplified laser pulse with the electro-optical modulator—being in the final switching state—is provided as to a circulation of the amplified laser pulse successive to the at least one intermediate circulation.

By that, a series (burst) of at least two laser pulses is extractable according to provided interactions of the amplified laser pulse at respective circulations with the electro-optical modulator (e.g. Pockels cell) being in respective switching states.

Regarding the circuit used with the laser assembly according to the invention, the circuit may comprise three switches, two power supplies and a variable current limiter.

Moreover, the electro-optical modulator may be connected to the circuit in such manner that with a first switching step a charging of the electro-optical modulator is induced and with a second switching step a controlled discharging of the modulator (cell) at least via the variable current limiter is provided (voltage drop).

In particular, at least the switches and the variable current limiter can be controlled by the controlling unit so that a voltage drop is applied to a Pockels cell in defined manner and a slope of the voltage drop and/or a temporal extend of the voltage drop is of defined manner, i.e. can be defined by respective settings of the controlling unit.

Preferably used current sources are known from prior art, e.g. from U. Tietze and Ch. Schenk, "Halbleiter-Schaltungstechnik", Springer, 13th Edition, p. 774.

According to a particular embodiment of the invention, the controlling unit and the circuit being cooperatively implemented to that—on execution of the pulse extraction sequence—an initial polarisation state of the amplified laser light of the amplified laser pulse is changed so that the resulting polarisation meets a defined extraction criterion, in particular wherein the extraction criterion being defined at least by the polarisation-selective element and defines a portion of the amplified laser pulse to be ejected from the laser assembly. In addition, the change of the initial polarisation state to an extraction polarisation state can be provided due to interaction of the amplified laser pulse with the electro-optical modulator during an intermediate and/or final switching state.

According to a preferred embodiment of the invention, the laser assembly comprises a polarisation-selective element, in particular a polarising beam splitter, for polarisation sensitive extraction of laser light from the amplified laser radiation, in particular wherein the polarisation-selective element is embodied by one of the two reflecting members. For instance, the polarising beam splitter provides reflecting of s-polarised light and transmitting of p-polarised light.

The invention also relates to a computer program product comprising programme code, which is stored on a machine-readable medium or being embodied by an electromagnetic wave comprising a programme code segment, having computer-executable instructions implemented for running the pulse extraction sequence according to an embodiment of the method mentioned above, in particular when run on a controlling unit of a laser assembly as mentioned above, in particular wherein the computer program product is provided by programmable logics or is implemented as hard-wired logics.

The method and the devices according to the invention are described or explained in more detail below, purely by way of example, with reference to working examples shown schematically in the drawings. Specifically, FIGS. 1a-b show embodiments of laser assemblies comprising an electro-optical modulator according to the invention;

Figure 1A:
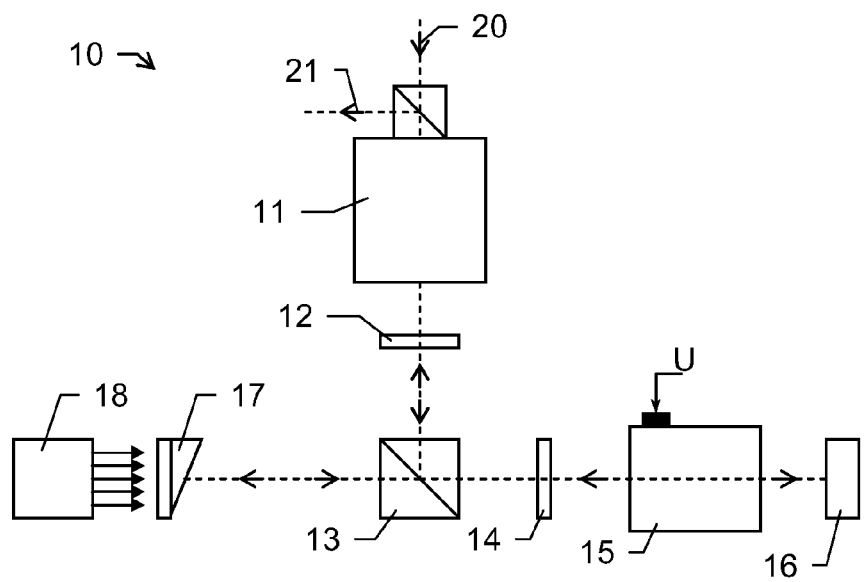

FIG. 1a shows (schematically) an embodiment of a laser assembly 10 according to the invention. Here, the laser assembly 10 is embodied as an optical regenerative amplifier. The assembly 10 comprises an isolator 11, e.g. a Faraday isolator, a first polarisation element 12, e.g. a half wave ($\lambda/2$) plate, a polarising beam splitter 13, a second polarising element 14, e.g. a quarter wave ($\lambda/4$) plate, a electro-optical modulator 15, e.g. a Pockels cell, a reflective end member 16, e.g. a HR-mirror, a laser medium 17, e.g. a Yb:wolframate crystal, with a semi-transparent coating and a pump light source 18, e.g. a laser diode.

As can be seen, the electro-optical modulator 15 is arranged in the beam path within the laser resonator, the resonator being defined by the first reflective end member 16 and the coating at the laser medium 17, which provides reflection of the amplifying laser radiation, i.e. with respect to the wavelength of the resulting amplified laser light, and transmission regarding the pump light. Alternatively, instead of a coating applied to the laser medium 17, a spatially separated reflecting member can be provided between the pump light source 18 and the laser crystal 17 (see FIG. 1b). A circulation time of laser light within the resonator is thus defined by the distance between the reflective end member 16 and the reflecting point at the coating or separated reflecting member on side of the laser medium 17.

The following is an exemplarily given description regarding the working principle of the laser assembly 10 as shown.

A laser beam, e.g. a seed laser pulse, with p-polarisation 20 is guided through the isolator 11 and the first polarising unit 12, whereby the polarisation of the laser beam is rotated so that the laser beam comprises s-polarisation. The beam splitter 13 reflects s-polarised light and thus introduces the light in the cavity (resonator). Next the laser light runs through the second polarising element 14, which provides a circular polarisation of the laser light.

The laser light then propagates through the electro-optical modulator 15. As the electro-optical modulator 15 is switched off (i.e. zero voltage is applied to the cell 15), the cell 15 is considered as passive element not influencing the polarisation. The beam is reflected at the mirror 16 and again propagates through the electro-optical modulator 15 and the polarising element 14 (e.g. quarter wave plate) resulting in a p-polarisation of the laser light and thus transmitting the beam splitter 13. After being reflected at the laser medium 17, the laser beam runs through the polarising element 14 and the electro-optical modulator 15 for third time, is reflected at the mirror 16 and runs through the cell 15 and the polarizer 14 for a fourth time. This propagation results in laser light of s-polarisation. Consequently, the laser light is then reflected at the splitter 13 and is ejected off the laser cavity as a (amplified) laser pulse 21. This process is also called "double pass" (of an injected seed laser pulse).

According to an alternative working principle, the electro-optical modulator 15 is actively driven with a defined voltage (U), e.g. by applying quarter wave voltage ($\lambda/4$-voltage) to the cell 15. The magnitude of the applied voltage (switching, amplification or gate voltage) particularly is chosen so that birefringence is provided by the cell 15). By doing so, the electro-optical modulator 15 actively influences the polarisation of propagating light, whereby an introduced laser pulse 20 can be trapped in the laser resonator as the polarisation of the amplified light is adjusted at each circulation of the laser light so that it transmits the beam splitter 13.

Additionally, such a trapped laser pulse is amplified with each circulation and can be ejected from the laser resonator by changing the state of the electro-optical modulator. This typically is realised by reducing the voltage at the cell to a zero voltage, which results in—again—the electro-optical modulator being a passive element. An amplified laser pulsed can be ejected from the resonator by such switching on demand.

Now, for switching the electro-optical modulator 15, according to the invention, a voltage change (here: voltage drop) according to a defined voltage curve is applied with respect to an amplification (gate) voltage applied to the electro-optical modulator 15.

According to that voltage curve, a voltage drop is applied starting from an initial amplification voltage applied to the modulator 15, which particularly corresponds to the gate voltage for "switching on" the cell 15.

The voltage drop defines a particular drop of voltage over time, i.e. a particular slope and/or jump with respect to the voltage. The voltage drop over time and the slope, respectively, being defined so that the magnitude of the slope is comparatively low (compared to a voltage drop according to prior art, wherein the drop is implemented to be as steep as possible in order to provide fast switching for extracting one laser pulse).

As a result of applying such relative slight voltage drop over time at the electro-optical modulator 15, the electro-optical modulator 15 provides intermediate switching states (at least one) as to the duration of dropping. Thus, laser light is provided, wherein only part of the circulating (in the resonator) laser light comprises s-polarisation when running through the beam splitter 13 and being reflected (and extracted). The rest of the laser light remains running in the resonator.

The time period for the voltage drop, i.e. the duration of the extraction sequence (voltage drop or rise and/or slightly dropping voltage slope), is adjusted to the time of circulation of the laser light within the resonator. This process provides extraction of at least two sub-laser-pulses (burst pulses) from the amplified laser radiation in the resonator by use of one single switching sequence. This means that not only one single laser pulse due to switching of the cell 15 is extracted by the switching process (i.e. by the application of the voltage drop), but a greater number of pulses is extractable from the cavity.

At least a first sub-pulse (burst pulse) is extracted due to a polarisation change induced by an interaction of the amplified laser light with the modulator in an intermediate switching state; a second (final) sub-pulse is extracted due to an interaction with the modulator being in the final switching state. Those switching states are different from each other and particularly provide different impacts on the interacting laser light concerning the effected changes of polarisation.

By adjusting the voltage drop with respect to its slope, respective voltage jumps and duration, even more than two sub-pulses can successively be extracted from the cavity. Moreover, by adjusting the slope respectively, a variation of e.g. pulse energies from pulse to pulse can be defined. For doing so, the extraction sequence may be implemented comprising at least two different voltage changing (dropping) regions with alternative slopes and/or voltages.

Figure 1B:
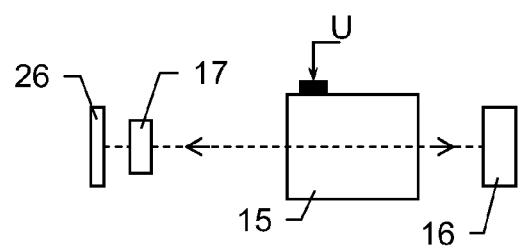

FIG. 1b shows a further embodiment of the present invention being in form of a laser resonator with two reflecting members 16,26, a laser medium 17 and a Pockels cell 15. Amplified laser radiation (a laser pulse) circulates inside of the resonator, wherein a defined gate (amplification) voltage is applied to the Pockels cell 15.

For extraction of a burst of laser pulses, i.e. generating a burst mode, the Pockels cell 15 is driven by applying, a defined, slight voltage drop at the Pockels cell 15 and thus providing such change of polarisation of the circulating laser light, so that a first portion of light remains circulating in the resonator, wherein an residual part of radiation is ejected off the assembly, e.g. due to an interaction with a polarising beam splitter.

Figure 2:
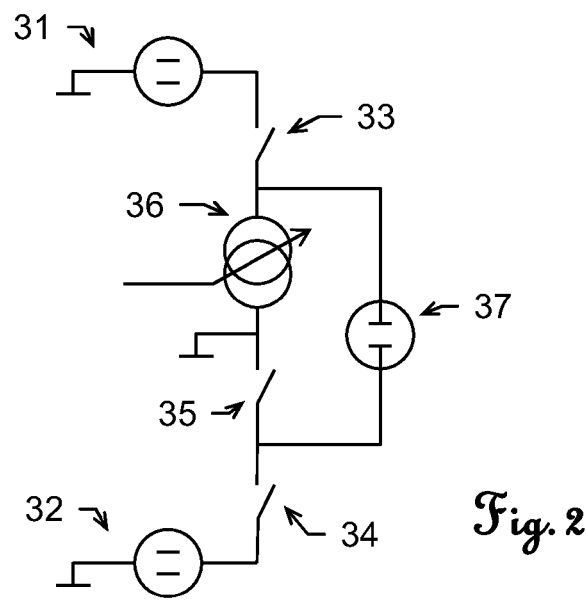
FIG. 2 shows an embodiment of the circuit for driving the Pockels cell according to the invention.

FIG. 2 shows an embodiment of the circuit for driving the Pockels cell according to the invention. The circuit comprises two high-voltage sources 31,32, three switches 33,34, 35 and a variable current limiter 36. Furthermore, a connection 37 with a Pockels cell (or any other suitable electro-optical modulator), which acts as a voltage-controlled waveplate inside a laser resonator, is provided. A controlling unit (not shown) is functionally connected to the circuit in order to at least trigger switchings and/or defining the setting s for the variable current limiter 36.

With respect to driving the resonator in the amplifying mode, a difference of potential regarding the applied voltages with the high-voltage sources 31,32 corresponding to the λ/4-voltage is to be applied in order to provide respective polarisation changes of the laser light circulating in the resonator at each circulation.

The circuit and the controlling unit are interconnected so that two high-voltage output pulses are simultaneously generable with help of the two high-voltage sources 31,32. As shown the Pockels cell is connected to both high-voltage sources 31,32 to receive the difference of both voltage pulses.

An embodiment of a method according to the invention is described in context of FIGS. 2 and 3 in the following. For inducing the generation of at least two laser pulses by only one switching process of the Pockels cell, the switches 33 and 34 are closed at a time $T_0$, wherein switch 35 is in an open position (uncompleted). By doing so, the amplification voltage (here: gate voltage, λ/4-voltage) is applied to the Pockels cell and the Pockels cell charges until a final charging state is obtained ($T_1$).

Then, the switches 33 and 34 are opened and switch 35 is completed at time $T_2$. As a consequence, a first electrode of the Pockels cell is directly grounded (by completing an electric connection to the shown grounding by switch 35). On the other hand, the second electrode of the Pockels cell is discharged via the variable current limiter 36, wherein the electrical charge of the second electrode discharges slowly and in controlled manner. The course of the resulting (total) voltage curve at the Pockels cell and in particular its gradient slope (between $T_2$ and $T_3$) depends on the adjustments of the variable current limiter 36.

Therefore, according to the invention, the presence and the adjustments of the variable current limiter 36 provide a slight decay of the voltage at the Pockels cell and thus provide for extraction of at least two laser pulses from circulating laser pulses off the resonator.

The time period from $T_2$ to $T_3$ (or $T_4$, respectively) is defined so that it is greater than the time of interaction of the amplified laser light with the Pockels cell and—depending on the number of intermediate pulses to be extracted—smaller than the circulation time of the laser light in the resonator for extracting one intermediate pulse or smaller than a multiple of it for extracting more intermediate pulses, wherein at least double interactions of the circulating laser pulse with the Pockels cell, at least one in intermediate polarisation state (switching state) and one in final switching state (here: zero voltage), is provided.

In the time period $T_3$ to $T_4$ the settings of the current limiter 36 are adjusted so that the voltage at the Pockels cell rapidly drops to zero.

Figure 3:
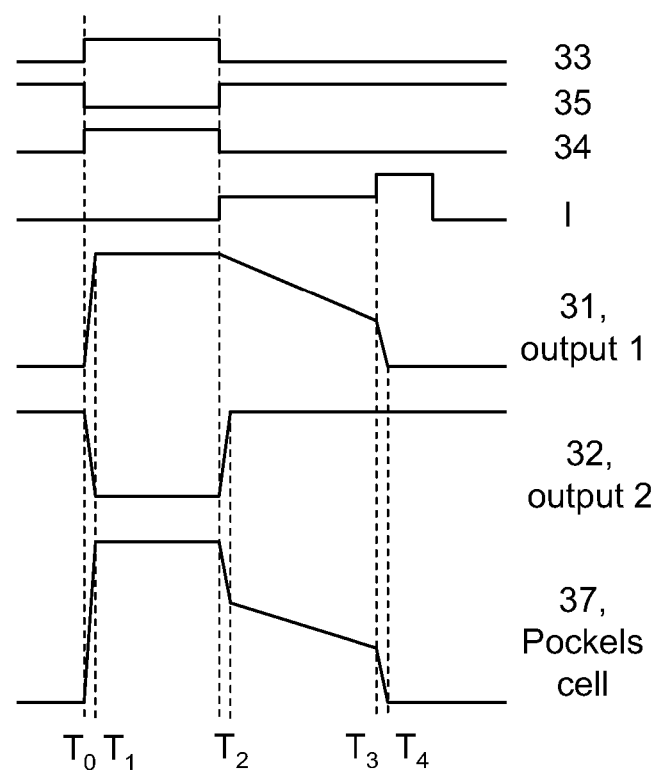
FIG. 3 shows a switching diagram for switching a Pockels cell according to the invention depicting switching points and respectively effected potential changes.

FIG. 3 shows the moments of switching of switches 33,34 and 35 ($T_0$ and $T_2$) the current (I) at the variable current limiter over time, the output voltages of the power supplies 31 and 32 (high-voltage sources) and the resulting voltage at the Pockels cell, i.e. the difference of the output signals of 31 and 32.

Concerning the duration of the time period (of the pulse extraction sequence, i.e. the switching sequence), the defined duration depends on the number of burst pulses to be generated.

For generating two pulses, the time period is shorter than the circulation time, as there is only need for one single intermediate switching state for a first circulation of the laser light and the final switching state for the successive second circulation. Thus, the intermediate switching state is provided during a first interaction of the laser light with the Pockels cell, wherein immediately after such interaction zero voltage (final switching state) can be applied for the second interaction.

For generating three burst pulses, the temporal extent of the time period has to be greater than the circulation time but smaller than double the circulation time. By doing so, two interactions of the laser light with two intermediate states are provided corresponding to the respective successive circulations of the light in the resonator.

Generally speaking, the correlation of duration of the time period (t), the number of interactions to be provided with intermediate switching states ($n_{is}$) and the circulation time ($t_c$) is given by:

$$n_{is} \cdot t_c > t > (n_{is}-1) \cdot t_c.$$

Figure 4:
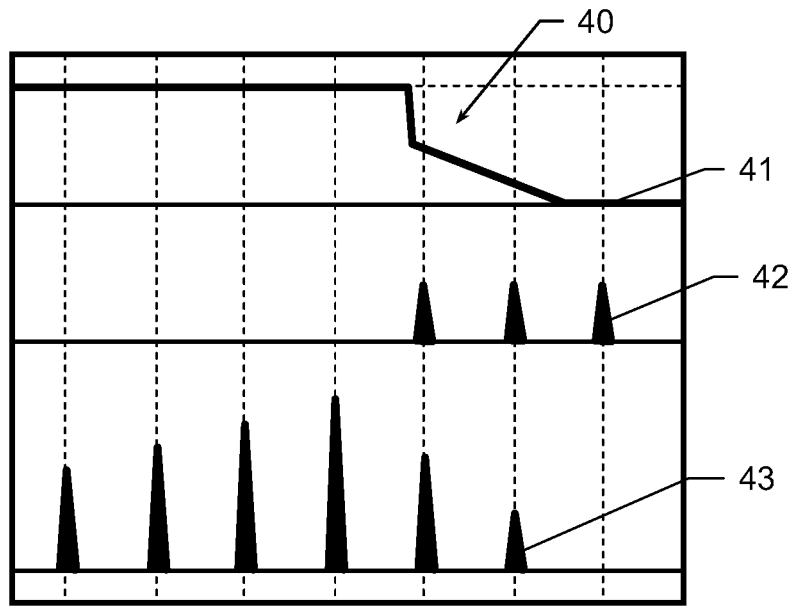
FIG. 4 shows the procedure of extraction of three laser pulses according to the invention from a laser assembly by one single switching sequence of a Pockels cell.

FIG. 4 shows the behaviour of a laser assembly according to the invention on extraction of three laser pulses by one single switching sequence of a Pockels cell.

On top, voltage over time at the Pockels cell 41 is shown, the voltage comprising a voltage drop 40 defined according to the invention. Such total voltage is produced by use of a specific circuit (comprising a respective driver or controlling unit, respectively) and respective triggering the switching steps of the circuit.

Below the total voltage 41, the generation of three laser pulses 42 which are produced by interactions of the circulating laser pulse in the resonator, the Pockels cell and the polarisation-selective element is shown. A defined delay between the start of the voltage drop 40 and extraction of the first pulse is given by means of switching and duration of changing polarisation states of the Pockels cell.

At bottom, the generation and amplification of the laser pulse circulating in the laser resonator 43 is depicted. With respect to the amplitude of the circulating laser pulse, the amplification by each circulation can be seen, wherein the amplitude decreases as soon as the first laser pulse is extracted from the circulating laser light and thus a part of the power of the circulating pulse is extracted.

The extracted laser pulses according to curve 42 are of basically same peak powers. This is provided by respective setting of the initial voltage drop and the slope of the voltage drop, respectively.

The circulation time of the laser pulse inside of the resonator corresponds to the distance of the maxima of the pulse signal represented by curve 43. The repetition frequency of the burst pulses depends on the circulation time of the amplified laser light.

According to a specific embodiment of the invention the slope of the voltage change (according to curve 41) is set to be in a range of 0 V/RT to 250 V/RT (RT=roundtrip or circulation).

Figure 5:
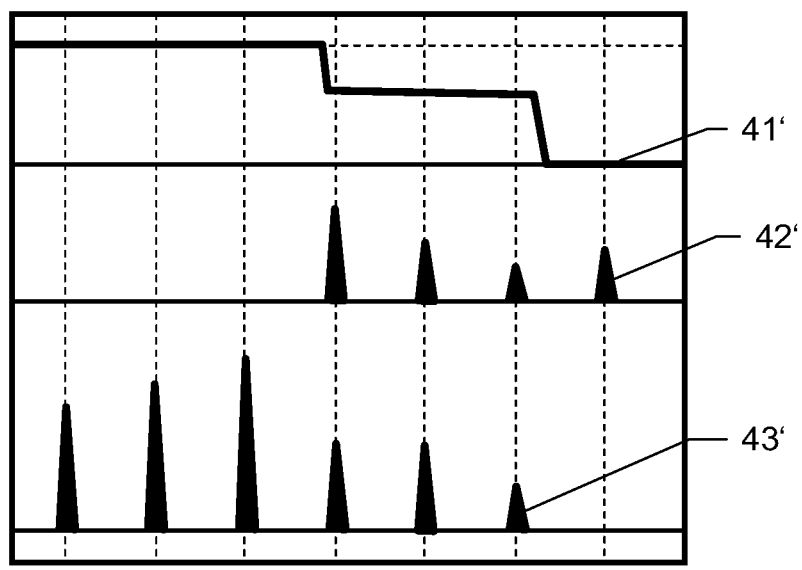
FIG. 5 shows a further exemplary operation of a Pockels cell according to the invention in context with extracted pulses and an amplification of a circulating pulse.

FIG. 5 shows a further exemplary operation of a Pockels cell of a laser assembly, e.g. of a regenerative amplifier, in context with extracted pulses and an amplification of a circulating pulse.

There are two main differences in the resulting extracted pulses compared to the embodiment of FIG. 4. First, here a burst of four and not of three pulses is extracted from the amplified pulse (see curve 42'). Second, the peak power of the extracted pulses varies (also see curve 42'). Again the decrease of the amplitude of measured circulating pulse (curve 43') can be seen due to starting extraction of the burst pulses.

By comparing the voltage drops of FIGS. 4 and 5 (curves 41 and 41') one can see the greater temporal extension of the voltage drop according to curve 41' (with reference to the circulation time represented by the time gap between the recorded pulse signals of curve 43') and a difference regarding the slope of the drop. As a result of such longer dropping time and respectively adjusted slope, four burst pulses can be extracted by one switching sequence, wherein respective peak powers of extracted pulses can be adjusted accordingly. Such adjustment of the voltage drop may for instance be provided by a circuit according to FIG. 2, wherein respective setting with the variable current limiter and the switching moments are chosen.

Enlarging the temporal extend of the pulse extraction sequence, leads to a greater number of interactions of the circulating laser light with the Pockels cell, which comprises at each interaction process a switching state that provides a defined change of polarisation of the laser light.

In particular, as also can be seen in FIG. 5, the pulse extraction sequence comprises at least two dropping regions each of which being defined with a particular voltage jump and/or slope and a defined duration regarding the voltage change within these regions.

Figure 6:
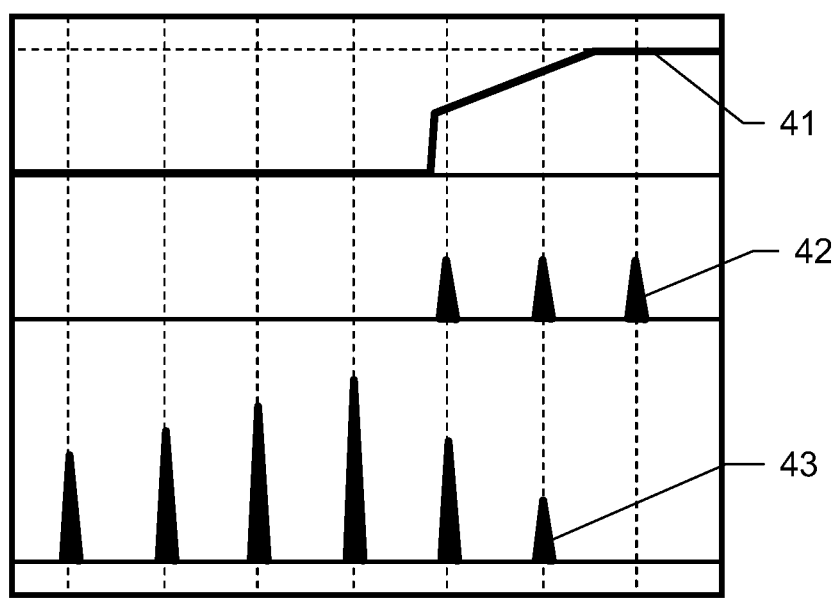
FIG. 6 shows a further exemplary operation of a Pockels cell according to the invention using a rising voltage applied to the cell.

FIG. 6 shows a further exemplary operation of a Pockels cell of a laser assembly, e.g. of a regenerative amplifier, in context with extracted pulses and an amplification of a circulating pulse. In contrast to FIGS. 4 and 5, here not a voltage drop but a voltage rise is applied to the Pockels cell which due to a correspondingly different design of the laser assembly itself provides generation of a number of burst pulses. A particular change of polarisation of the circulating laser light is effected by an increase of the applied voltage, wherein the slope of the increasing voltage is adjusted so that two laser pulses are extracted due to respective intermediate switching states of the cell and a third pulse is extracted due to an interaction with the cell in the final (charged) state, all three pulses being generated with basically same properties (e.g. power).

Although the invention is illustrated above, partly with reference to some specific embodiments, it must be understood that numerous modifications and combinations of different features of the embodiments can be made and that the different features can be combined with laser assemblies and/or pulsed laser systems known from prior art.

The invention claimed is:
1. Method for generating a series of laser pulses with a laser assembly, in particular a laser resonator or a regenerative amplifier, the laser assembly at least comprising
   two reflecting members, in particular one of which being partly transparent as to a defined wavelength,
   a laser medium and
   an electro-optical modulator, in particular a Pockels cell, for providing voltage-controlled change of polarisation and/or phase,
the method comprising
   operating the laser assembly in a light amplifying mode by applying an amplification voltage to the electro-optical modulator and thereby providing circulation of an introduced seed laser pulse in the laser assembly with defined circulation time and amplification of the seed laser pulse due to interactions with the laser medium on each circulation, wherein an amplified laser pulse is provided, and
   running a pulse extraction sequence for extracting at least one laser pulse from the laser assembly by varying the amplification voltage applied to the electro-optical modulator,
further comprising
running the pulse extraction sequence for a defined time period by applying a defined voltage change with reference to the amplification voltage, wherein changing of the voltage is adjusted such that
   at least one intermediate switching state is generated on side of the electro-optical modulator by applying an intermediate voltage within the time period, the intermediate switching state providing a particular change of polarisation of an amplified laser radiation by the electro-optical modulator,
   a final switching state is generated on side of the electro-optical modulator by applying a final extraction voltage at the end of the time period,
   at least one intermediate interaction of the amplified laser pulse with the electro-optical modulator in the at least one intermediate switching state is provided as to at least one respective intermediate circulation of the amplified laser pulse, and
   a final interaction of the amplified laser pulse with the electro-optical modulator in the final switching state is provided as to a circulation of the amplified laser pulse successive to the at least one intermediate circulation, so that a series of at least two laser pulses is extracted according to the interactions of the amplified laser pulse at each circulation with the electro-optical modulator being in respective switching states.

2. Method according to claim 1,
wherein
the polarisation of the amplified laser light of the circulating amplified laser pulse is changed by interactions with the electro-optical modulator in intermediate and/or final switching states with each circulation so that the resulting polarisation meets a defined extraction criterion.

3. Method according to claim 1,
wherein
the electro-optical modulator interacts with the amplified laser pulse—in presence of the intermediate or final switching state—so that the amplified laser pulse is provided with a changed polarisation state, wherein the changed polarisation state is defined by a ratio of at least two polarisation portions, the ratio depends on the applied intermediate voltage.

4. Method according to claim 1,
wherein
a part of the amplified laser pulse is extracted based on polarisation sensitive splitting of the amplified laser light of the amplified laser pulse, in particular wherein one of the at least two polarisation portions is extracted.

5. Method according to claim 1,
further comprising
synchronising the application of the defined voltage change with a propagation of the amplified laser pulse within the laser assembly so that the amplified laser pulse interacts with the electro-optical modulator during the at least one intermediate switching state.

6. Method according to claim 1,
wherein
a first pulse of the series of at least two laser pulses is extracted due to an interaction of the amplified laser pulse with the electro-optical modulator in a first intermediate switching state and
a second pulse of the series of at least two laser pulses is extracted due to an interaction of the amplified laser pulse with the electro-optical modulator in a second intermediate switching state,
in particular wherein the voltage change is temporally adjusted with respect to the propagation of the amplified laser pulse in the laser assembly.

7. Method according to claim 1,
wherein
the amplification voltage corresponds to
a gate voltage of the electro-optical modulator, in particular a λ/4-voltage, or
zero voltage,
and/or
the voltage change is in form of a voltage drop or a voltage rise, in particular comprising a voltage jump,
in particular wherein the amplification voltage and/or the voltage change depends on the design of the laser assembly.

8. Method according to claim 1,
further comprising
defining a set of voltage parameters for the voltage change, the voltage parameters defining a slope for the voltage change and/or a temporal extend of the time period.

9. Method according to claim 8,
wherein
the voltage parameters are defined in a manner such that
the temporal extend of the time period corresponds to at least the circulation time, in particular to a multiple of the circulation time, of the amplified laser pulse in the laser assembly for proving at least two intermediate laser pulses, and/or
the slope for the voltage change is comparatively shallow, in particular in a range of 0 V to 250 V per circulation.

10. Method according to claim 1,
wherein
pulse extraction sequence comprises at least two voltage changing regions, each of which defining a defined course of the voltage change providing particular pulse parameters, in particular pulse peak power, in particular wherein the course of the voltage change is defined varying over the at least two voltage changing regions.

11. Laser assembly, in particular a laser resonator or a regenerative laser amplifier, for generating a series of laser pulses, providing a defined circulation time of an amplified laser pulse in the laser assembly and comprising at least
two reflecting members, in particular wherein at least one of which is partly transparent for a wavelength of pump-light,
a laser medium,
an electro-optical modulator, in particular Pockels cell, for providing voltage-controlled change of polarisation and/or phase and for extraction of laser light from the laser assembly by varying an amplification voltage applied to the electro-optical modulator,
a circuit for providing defined voltages to the electro-optical modulator and thereby driving the electro-optical modulator and
a controlling unit at least for controlling switching of the circuit in a manner such that the defined voltages are applied to the electro-optical modulator,
wherein
the controlling unit and the circuit being cooperatively implemented so that the voltage is applicable to the electro-optical modulator according to a defined pulse extraction sequence, the pulse extraction sequence comprising a defined voltage change with reference to the amplification voltage for a defined time period, wherein changing of the voltage is adjusted such that
at least one intermediate switching state is generated on side of the electro-optical modulator by applying an intermediate voltage within the time period, the intermediate switching state providing a particular change of polarisation of the amplified laser radiation by the electro-optical modulator,
a final switching state is generated on side of the electro-optical modulator by applying a final extraction voltage at the end of the time period,
at least one intermediate interaction of the amplified laser pulse with the electro-optical modulator being in the at least one intermediate switching state is provided as to at least one respective intermediate circulation of the amplified laser pulse, and
a final interaction of the amplified laser pulse with the electro-optical modulator in the final switching state is provided as to a circulation of the amplified laser pulse successive to the at least one intermediate circulation,
so that a series of at least two laser pulses is extractable according to the provided interactions of the amplified laser pulse at each circulation with the electro-optical modulator being in respective switching states.

12. Laser assembly according to claim 11,
wherein
the circuit comprises
three switches,
two power supplies and
a variable current limiter,
in particular wherein
at least the switches and the variable current limiter are controllable by the controlling unit so that the voltage change is applied to the electro-optical modulator in defined manner and a slope of the voltage change and/or a temporal extend of the voltage change is of defined manner.

13. Laser assembly according to claim 11,
wherein
the laser assembly comprises a polarisation-selective element, in particular a polarising beam splitter, for polarisation sensitive extraction of laser light from the amplified laser radiation, in particular wherein the polarisation-selective element is embodied by one of the two reflecting members.

14. Laser assembly according to claim 11,
wherein
the controlling unit and the circuit being cooperatively implemented so that by execution of the pulse extraction sequence
an initial polarisation state of the amplified laser light of the amplified laser pulse is changed so that the resulting polarisation meets a defined extraction criterion, in particular wherein the extraction criterion being defined at least by the polarisation-selective element and defines a portion of the amplified laser pulse to be ejected from the laser assembly,
the change of the initial polarisation state to an extraction polarisation state is provided due to interactions of the amplified laser pulse with the electro-optical modulator during the at least one intermediate and/or the final switching state.

15. Computer program product comprising programme code, which is stored on a machine-readable medium or being embodied by an electromagnetic wave comprising a programme code segment, having computer-executable instructions implemented for running the pulse extraction sequence according to the method of claim 1, in particular when run on a controlling unit of a laser assembly according to, in particular wherein the computer program product is provided by programmable logics or is implemented as hard-wired logics.

* * * * *